United States Patent [19]
Yu et al.

[11] Patent Number: 5,612,951
[45] Date of Patent: Mar. 18, 1997

[54] OUTPUT BUFFER TYPE ASYNCHRONOUS TRANSFER MODE(ATM) SWITCH

[75] Inventors: Keol W. Yu; Tae S. Chung, both of Daejeon, Rep. of Korea

[73] Assignees: Electronics and Telecommunications Research Institute, Daejeon; Korea Telecommunication Authority, Seoul, both of Rep. of Korea

[21] Appl. No.: 513,119

[22] Filed: Aug. 9, 1995

[30] Foreign Application Priority Data

Dec. 13, 1994 [KR] Rep. of Korea .................. 1994-34021

[51] Int. Cl.$^6$ .................................................. H04L 12/54
[52] U.S. Cl. .......................... 370/395; 370/411; 370/417
[58] Field of Search ........................... 370/58.1, 60, 60.1, 370/94.1, 94.2

[56] References Cited

U.S. PATENT DOCUMENTS 5,341,369 8/1994 Langer ..................... 370/94.1
5,392,279 2/1995 Taniguchi ..................... 370/60
5,440,553 8/1995 Widjaja et al. .............. 370/60

*Primary Examiner*—Melvin Marcelo
*Attorney, Agent, or Firm*—Keck, Mahin & Cate

[57] ABSTRACT

The present invention relates to an output buffer type Asynchronous Transfer Mode(ATM) switch that enables decentralized processing, which simultaneously sends multiple inputted cells to each output line, and makes implementation easy by modularization, and without speed-up, could process high-speed data inputted/outputted through input/output lines by comprising: a Batcher Sorting Network arraying, in the order of output line group number, $N(N=2^1, 2^2, \ldots, 2^n$, n is natural numbers) cells simultaneously inputted through N input lines of the switch; an Expanded Banyan Routing Network outputting cells arrayed in said Batcher sorting Network to the corresponding output line group containing each output line; and an Output Queueing Modules temporarily storing cells, outputted from said Expanded Banyan Routing Network, in the buffer used as a common memory and sending these cells to the final output lines.

7 Claims, 7 Drawing Sheets

OUTPUT BUFFER TYPE ASYNCHRONOUS TRANSFER MODE(ATM) SWITCH

BACKGROUND OF THE INVENTION

The present invention relates to a switch used in the Broadband Integrated Services Digital Network(hereinafter referred to as BISDN) adopting Asynchronous Transfer Mode(hereinafter referred to as ATM) and, in particular, relates to an output buffer type ATM switch dividing output lines into several output groups so that output lines in a same group share a common buffer, thus having multiple paths between input lines and output lines.

ATM switches have been rigorously developed during the past several years and currently proposed ATM switches have four types: common buffer type, common medium type, space division type, and complete connection type. The common buffer type switch has one buffer commonly used by all the input/output lines and thus requires that the speed of a processor controlling the buffers should be increased in proportion to the number of input/output lines. Hence, the number of input/output lines in a switch is limited by the speed of the processor.

The common medium type switch also has the same limitation resulting from having only one medium to be shared. Therefore, common buffer type and common medium type are used in small-capacity switches rather than in large-capacity switches due to a problem, of speed-up. On the other hand, space division type and complete connection type switches have the advantage of having no speed-up problem even in large-capacity switches.

FIG. 1 shows the structure of an 8×8 Banyan network(hereinafter, for example, N×N network means a network with N input lines and N output lines) which is a traditional space division type switch. In an 8×8 Banyan network, twelve basic Switching Elements(hereinafter referred to as SE) are arrayed in three stages. Hence, in a N×N Banyan network with N input lines, $log_2N \times (N/2)$ SEs are arrayed in $log_2N$ Stages.

A SE with two input/output ports checks one bit among output port addresses included in a cell inputted through each input port and sends the cell to the lower-end or upper-end output port when the checked bit has value 1 or 1 respectively.

The aforementioned space division type switch is easy to operate, and due to the distributed processing, eliminates the processing speed problems arising from high-speed processing inside the switch. It is also easy to diagram the interconnection structure between one stage and another stage of the SEs. Since space division type switch due to a blocking of the switch, is not limited by the number of input/output lines increasing in a large-capacity switch, it has been rigorously developed as a basic structural model for the BISDN switch.

The aforementioned switch, however, has a problem of low efficiency due to the cell collision phenomenon arising in the inner part or output lines of the switch.

Suppose output line addresses are 101 and 100, respectively for two cells inputted through two input lines(1, 4). Since the two cells have the same most significant bit of output line addresses impressed by two input ports of the SE 116, they are sent to the same output port(0), resulting in an inner cell collision. Therefore, only one cell is successfully sent to the output line and the remaining cell is either lost or sent to the other output line through output port(1), resulting in a cell loss.

Suppose output line addresses have the same value of 011 for two cells inputted through two input lines (0, 7). Then, the two cells are respectively inputted through two input ports (0, 1) of SE 120 in the stage-2, resulting in an output line cell collision. Since the least significant bits of two cells have the same value of 1, only one cell is outputted to the output line(3) through the desired output port(l) of the SE, and the other cell is lost. Considering $10^{-6}$ cell loss, which is one factor of the Quality of Service (QOS), the space division type switch should not have the problem of cell collision to be eligible for the BISDN.

FIG. 2 shows the structure of a traditional Batcher-Banyan switch which solves the problem of a cell collision. A Batcher-sorting network (hereinafter referred to as BSN) 201 and a Banyan network 202 are serially arrayed in this structure. This switch arrays input line cells in the order of output line address from the top(the lowest address) to the bottom (the highest address). Cells with-the same output line addresses are adjacently outputted and idle cells are outputted through the lower output line of BSN 201. Each cell outputted through the BSN is sent to the desired output line of the switch through the Banyan network 202.

The aforementioned Batcher-Banyan switch eliminates inner cell collisions by firstly executing sorting through the BSN, and secondly routing through the Banyan network. But cells with the same output line address still have the problem of an output line cell collision.

Considering the fact that, under the BISDN environment, diverse output line addresses of the cells causes a higher cell loss rate by an output line cell collision rather than by an inner cell collision, the Batcher-Banyan switch still has the shortcoming of high cell loss rate.

FIG. 3A and 3B show the structure of a Knockout switch which is a traditional complete connection type. A Knockout switch generally has a bus type structure, as shown in FIG. 3A, and a packet filter 301 is connected to each bus, as shown in FIG. 3B. A cell is inputted to the output buffer 303 through said packet filter 301 and the concentrator 302. N input cells are concentrated as L output cells through the knockout tournament at the concentrator 302 and sent to the output buffer 303, as shown in FIG. 3C.

Since said complete connection type switch has a unique path between an input line and an output line, all input cells are simultaneously sent to their desired output lines. Hence, the complete connection type switch has an ideal structure where there is no cell loss. But, the number of all cross points of the switch is increased to $N^2$ when the number of input lines is N. This fact causes the complexity of hardware in a large capacity switch. Thus, the complete connection type switch is limited to small capacity uses.

SUMMARY OF THE INVENTION

It is therefore an object of the present invention to solve the aforementioned problems by providing an output buffer ATM switch which enables the processing of high speed data (e.g., 150 Mbits/sec) inputted/outputted through each input/output line.

It is another object of the present invention to provide an output buffer ATM switch, which enhances output level and has multiple paths between the input lines and the output lines of the switch, and also has decentralized processing ability and modularized structure.

In order to attain the foregoing objects, an ATM switch, according to the present invention, comprises: a BSN arraying, in the order of output line group number, $N(N=2^1, 2^2,$ ..., $2^n$, n is natural number) cells simultaneously inputted through N input lines of the switch; an expanded Banyan routing network (hereinafter referred to as EBRN) outputting cells arrayed in said BSN to the corresponding output line group containing each output line; and an output clueueing modules (hereinafter referred to as OQM) temporarily storing cells outputted from said EBRN in the buffer used as a common memory and sending these cells to the output lines.

BRIEF DESCRIPTION OF THE DIAGRAMS

The above and other objects, features and advantages of the present invention will be clearly understood from the following detailed description taken in conjunction with the accompanying diagrams, in which.

Figure 1:
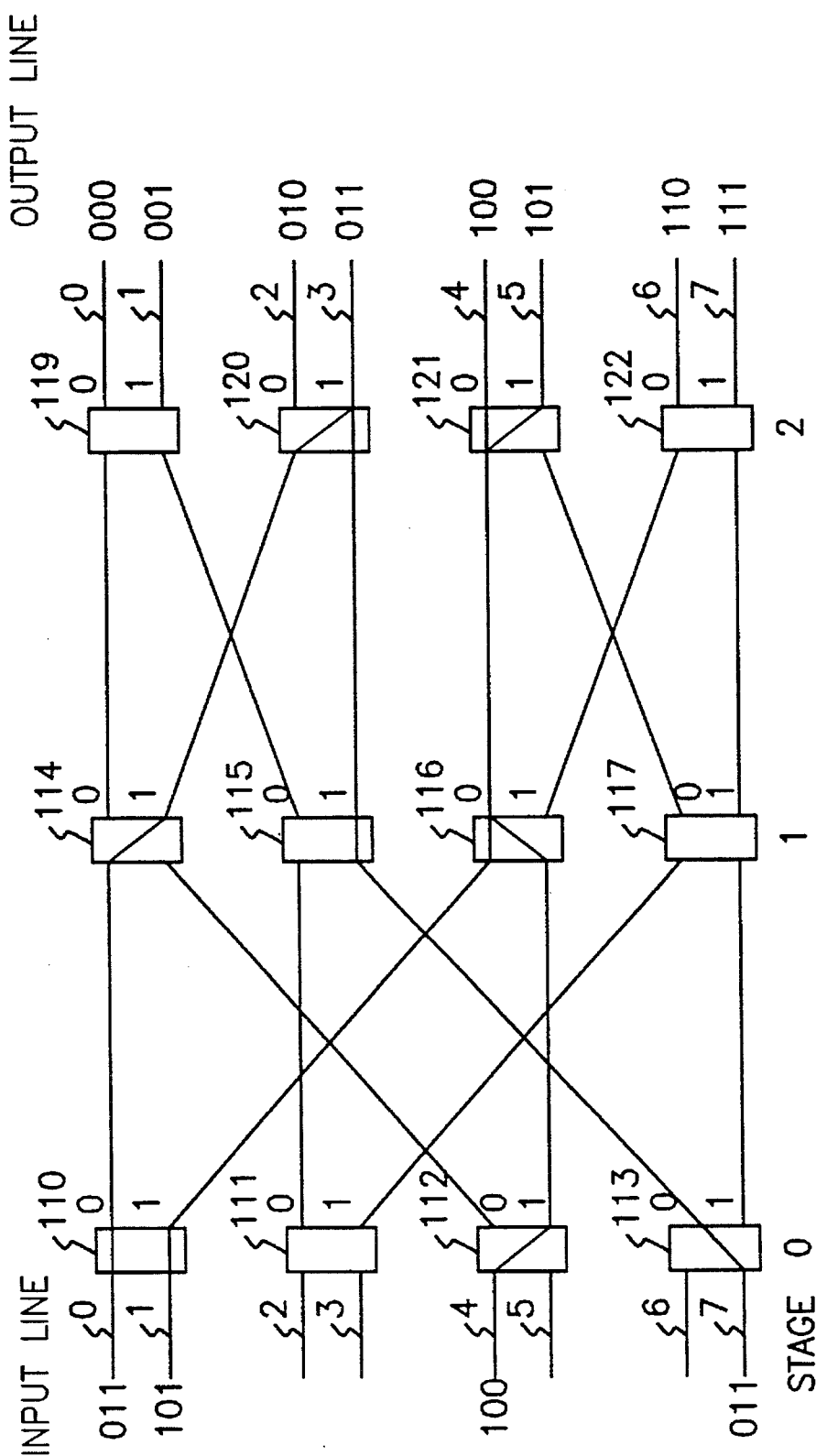
FIG. 1 shows the structure of a Banyan switch.
Figure 2:
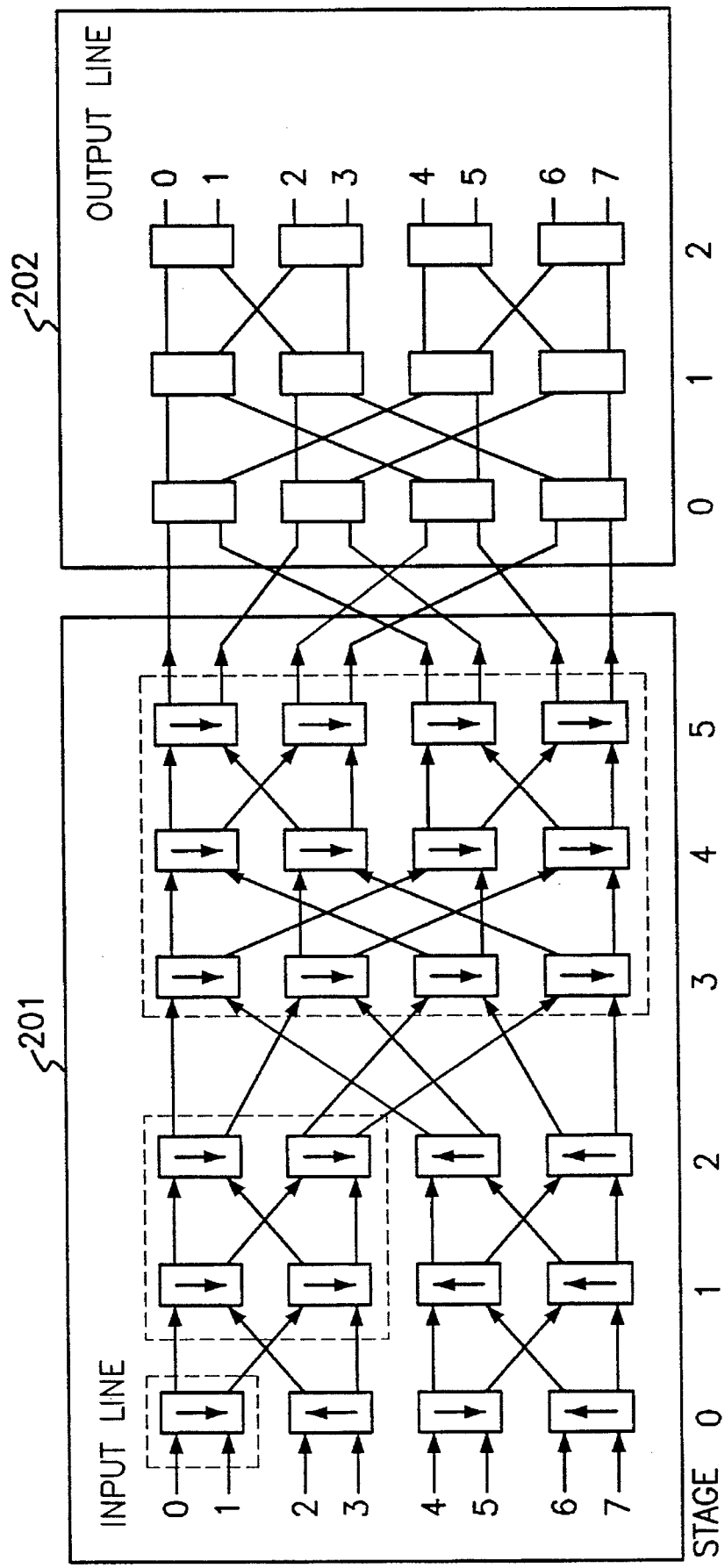
FIG. 2 shows the structure of a Batcher-Banyan.
Figure 3A:
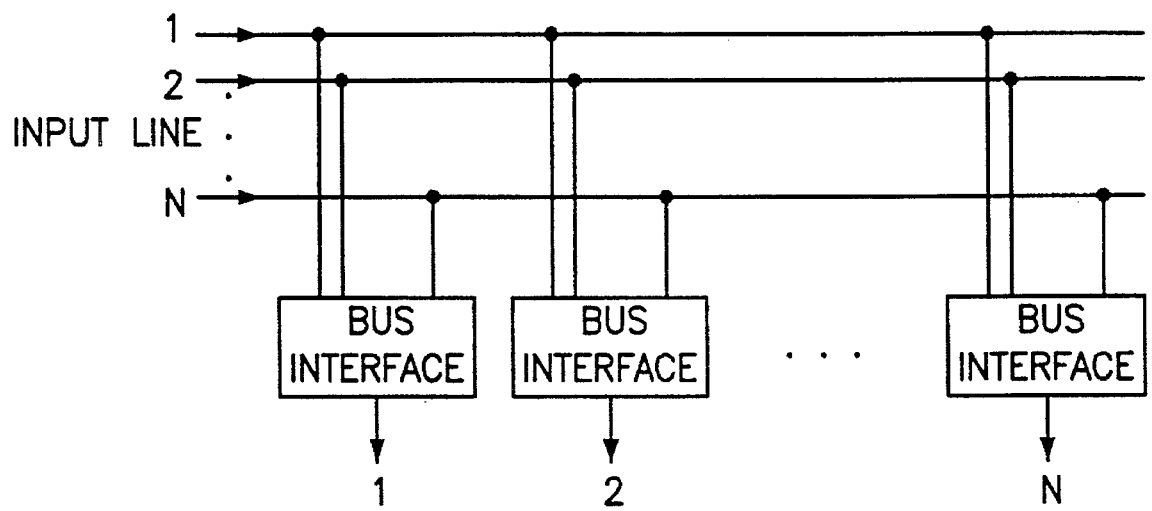
Figure 3B:
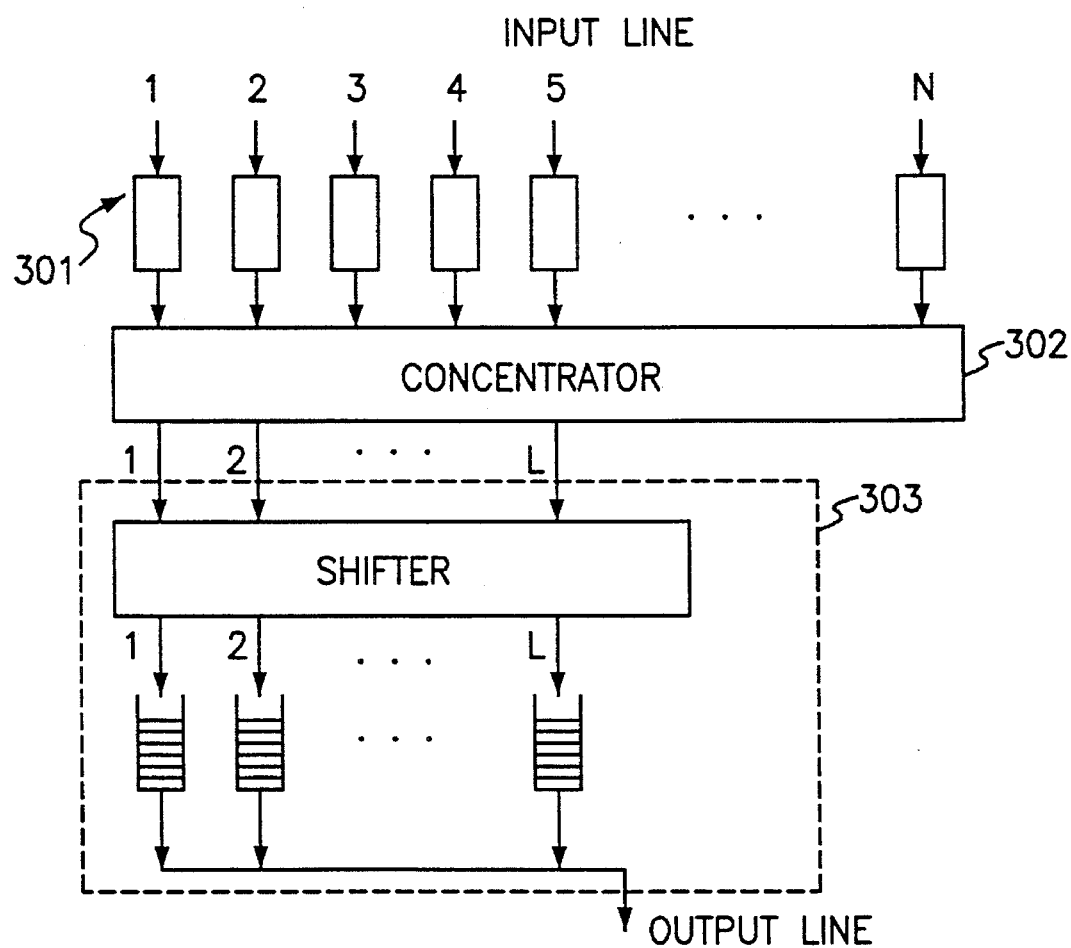
Figure 3C:
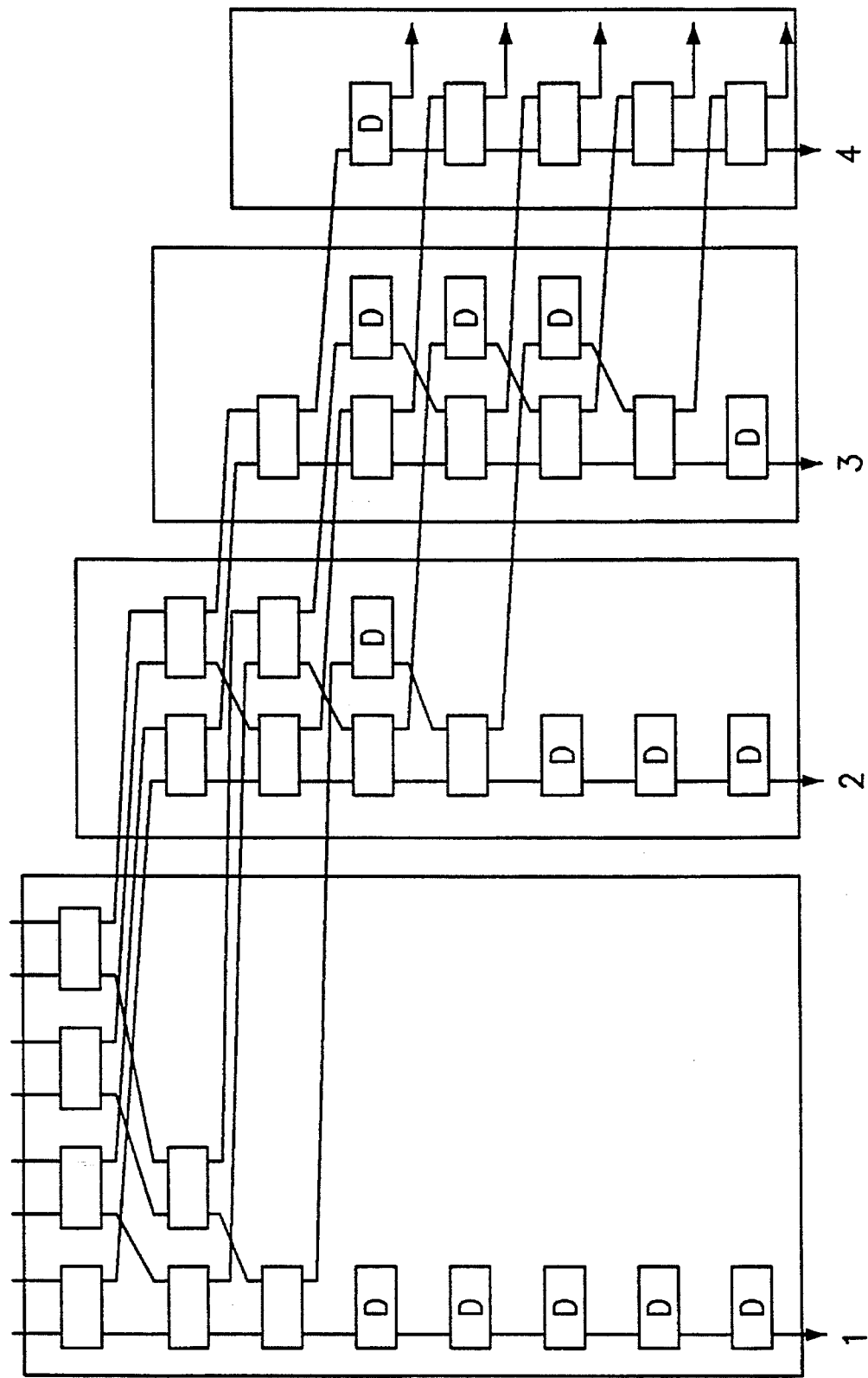
Figure 4:
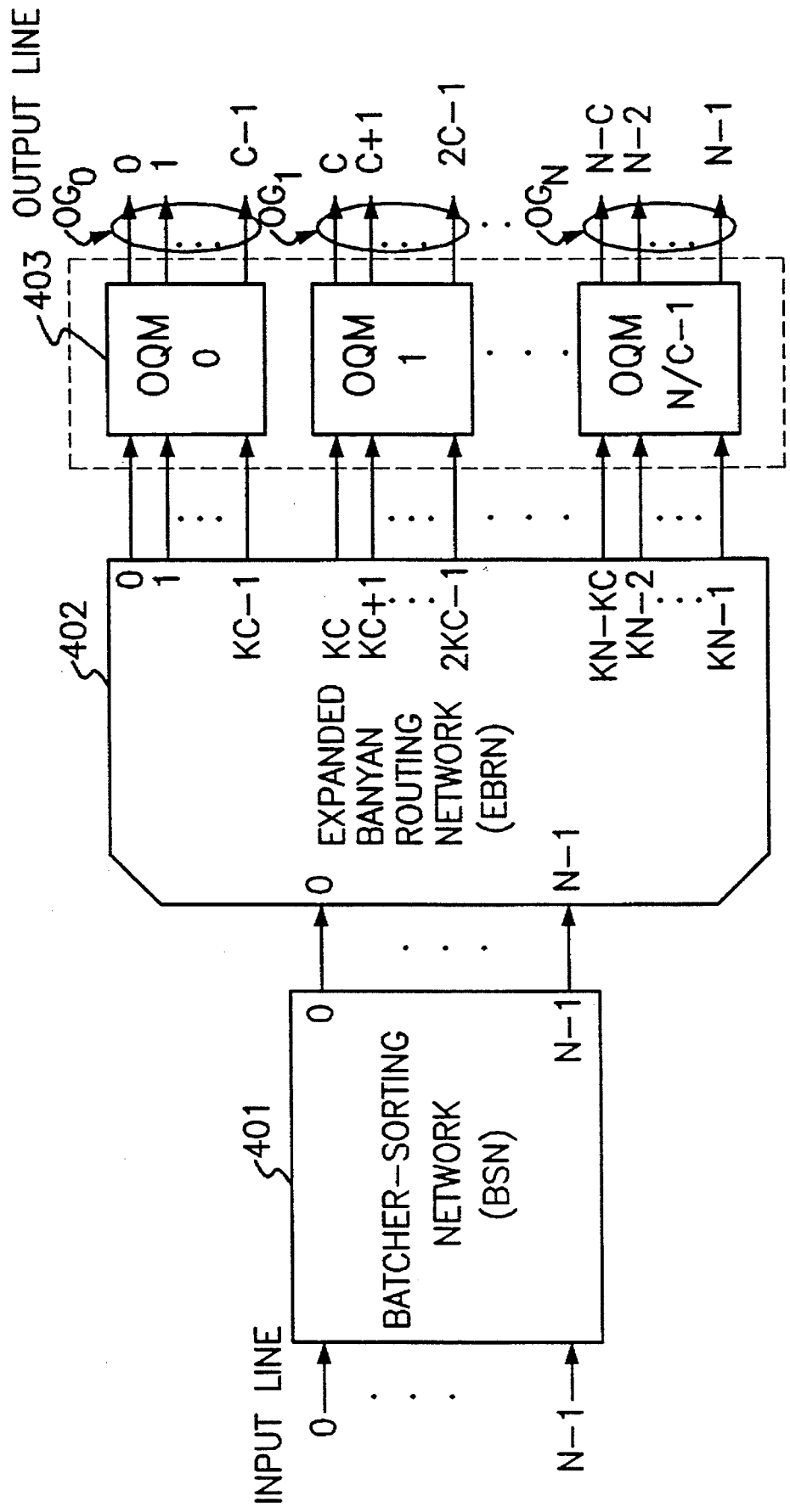
Figure 5:
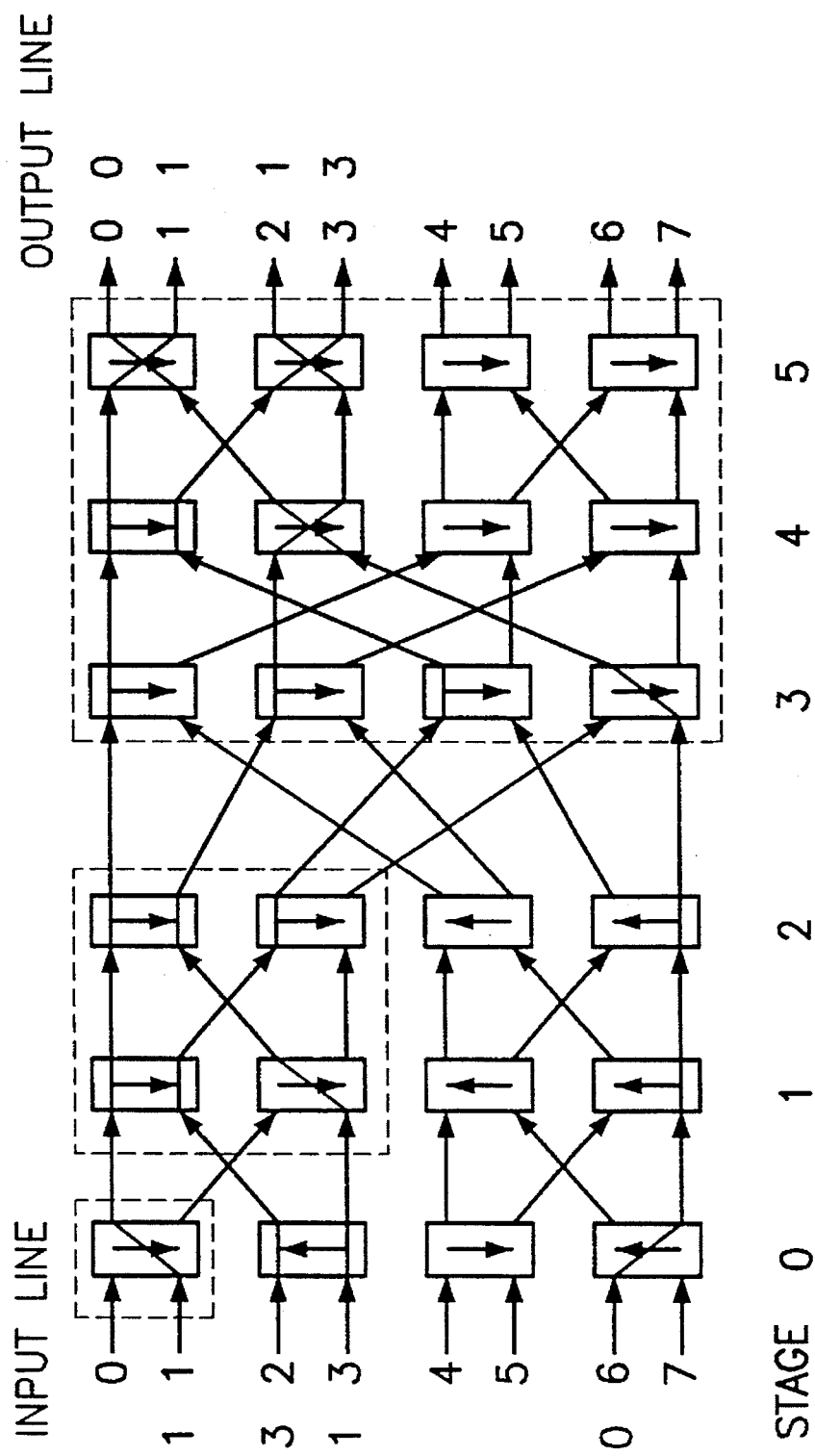

FIG. 3A, 3B, 3C explain the operation methods of a Knockout switch;

FIG. 4 shows the structure of an output buffer ATM switch according to the present invention;

FIG. 5 shows the inner structure of a BSN depicted in FIG. 4; and

Figure 6:
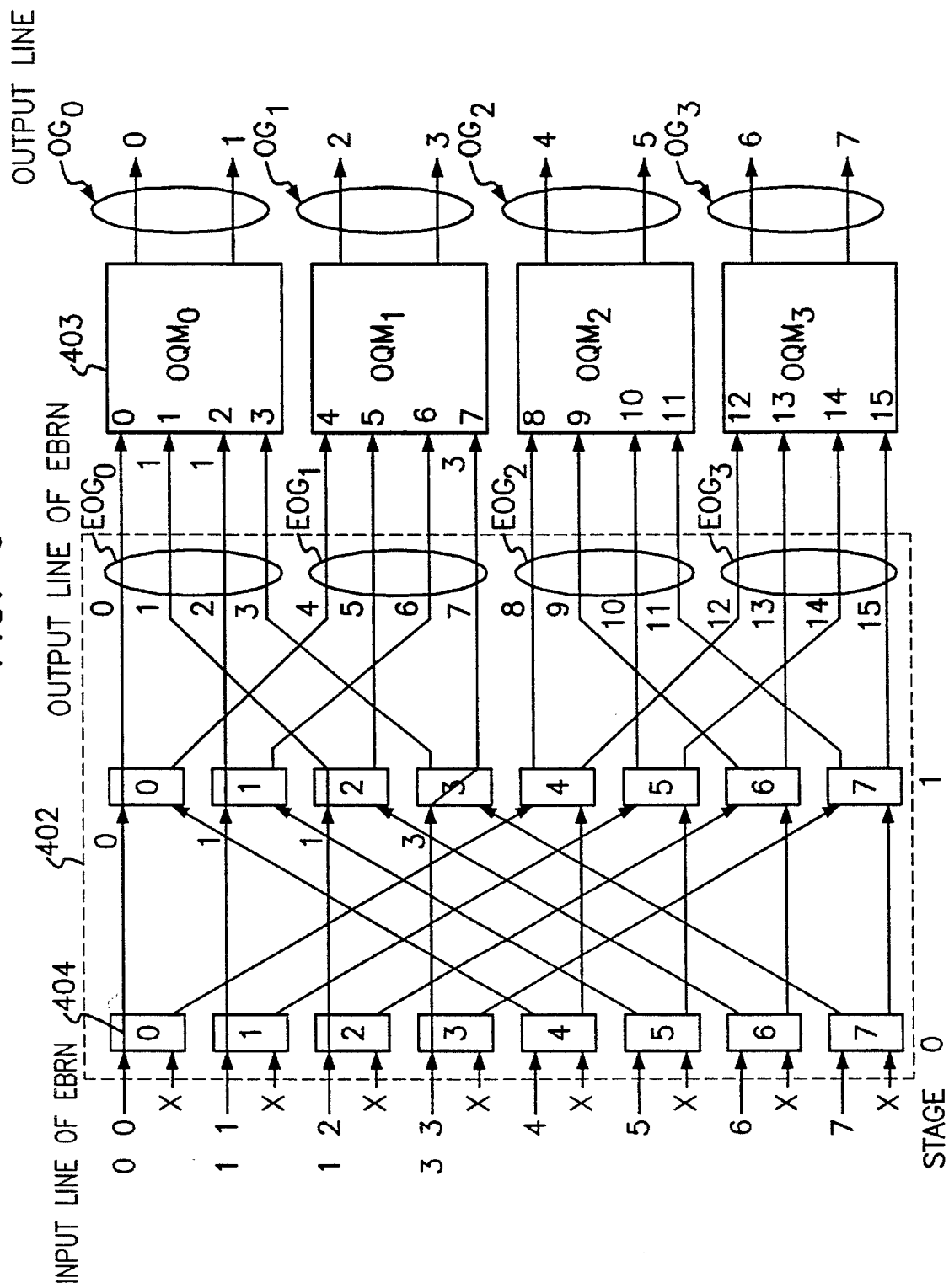

FIG. 6 shows the inner structure of a EBRN depicted in FIG. 4.

(Explanation of the numbered parts in the Figures: 401 BSN, 402 EBRN, 403 OQM, 404 SE)

DETAILED DESCRIPTION OF THE PREFERRED EMBODIMENTS

FIG. 4 (FIG. 6) shows the structure of a switch, according to the present invention. $N(N=2^1, 2^2, \ldots, 2^n$, n is natural number) cells (O to N-1), simultaneously inputted through N input lines of the switch, are arrayed in the order of output line group number(that is, $OG_0, \ldots, OG_3$ in FIG. 6) by the N×N BSN 401 and cells to be sent to a same output line group are adjacently arrayed, and idle cells are outputted to the lower end part.

Cells arrayed through the BSN 401 are sent to the corresponding output line group containing each output line through the N×NK EBRN 402 which has expansion rate $K(K=2^1, 2^2, \ldots, 2^k$, k is natural number) and consists of $\log_2 N$—$\log_2 C$ stages ($C=2^1, 2^2, \ldots, 2^c$, c is natural number).

These cells are then sent to each corresponding output line through N/C(number of OOMs) KC×C OQM.

In the following, detailed structure and operation mechanism of each structural part are explained in the case where N=8, K=2, C =2.

FIG. 5 shows the inner structure of a BSN which consists of multiple sorting elements having two input ports and two output ports. Among two cells inputted through two input ports of a sorting element, the cell with the larger output line address is connected in the direction of the arrow indicated in the sorting element, and the cell with smaller address is connected in the opposite direction of the arrow. Hence, as shown in FIG. 5, cells sent through the BSN are arrayed in the order of the size of output line group address (the cell with the smallest address at the top), and idle cells are outputted to the lower-end part. Since there is no buffer in the inner part of a BSN, an inner cell collision does not occur.

In the case where four cells are inputted through input ports (1, 2, 3, 6) of the sorting element of a BSN and the output line addresses of these cells are 1, 3, 1, 0 respectively, and output lines have two groups(group 0 and group 1), routing operation of the BSN is the following:

Four cells outputted to output lines(O, 1, 2, 3) of the BSN have output line addresses 0, 1, 1, 3 respectively(see FIG. 5), and cells with output line addresses 0, 1, 1 are rearrayed as output group 0 and cells with address 3 as output group 1 (see FIG. 6). Since said rearray is executed not by output line addresses but by output line groups, no rearray occurs among the cells having different output line addresses in the same group. Hence, cells with different output line addresses in a same group are always equally arrayed.

FIG. 6 shows the inner structure of an EBRN, having the structure of a Banyan network. Multiple SEs 404 configuring the EBRN have two input/output ports respectively and transmit cells inputted through the input ports of SE to the output ports of SE, according to output line addresses. An output line address is expressed as $b_0 b_1 \ldots b_{n-1}$ which is a binary number of n bits, with $b_0$ being the most significant bit. For example, output line address 4 could be expressed as 100, with 1 being the most significant bit. Each SE, according to the stage where it belongs, checks one bit among the output line address of a cell inputted through the input line of a EBRN and outputs the cell to the lower output line of the EBRN when the bit is 1; and to the upper output line of the EBRN when the bit is 0. In the case where the bits of output line addresses of two inputted cells are same, the two cells are connected to the same output line of the EBRN, thus cell collision occurs with the result being that only one cell is successfully sent. On the other hand, the BSN in FIG. 5 rearrays four cells with output line addresses 0, 1, 1, 3, respectively. These four cells are inputted through four input lines(0, 1, 2, 3) of the EBRN and outputted to four output lines(0, 1, 2, 7) of the EBRN. OQM 403 has K×C(=4) input lines and C(=2) output lines and, as a common buffer type internally, has a function of storing cells inputted through the input lines of OQM in the buffer used as a common memory and sending these cells to final output line groups. As explained above, the present invention relates to an ATM switch used in the BISDN which adopts an asynchronous transfer mode. This ATM switch enables decentralized processing which could simultaneously send multiple inputted cells to each output line and make implementation easy by modularization, and without speed-up, process high-speed data inputted/outputted through the input/output lines. Furthermore, this switch could get enhanced output by adopting the output line buffer type and make it easy to execute-multicasting and broadcasting in the inner part of each output line group. Finally, multiple paths between input lines and output lines lowers cell loss rate by preventing cell collisions.

.Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What we claim are:

1. An ATM switch comprising:

a BSN arraying N cells in the order of output line group number, wherein $N=2^1, 2^2, \ldots, 2^n$ and n is a natural number;

cells simultaneously inputted through N input lines of the switch;

an EBRN outputting cells arrayed in said BSN to the corresponding output line group containing each output line;

and an OQM temporarily storing cells outputted from said EBRN in a buffer used as a common memory and sending these cells to the final output lines.

2. An ATM switch according to claim 1, in which said BSN has N input lines and N output lines.

3. An ATM switch according to claim 1, in which said EBRN has expansion rate K and has N input lines and NK output lines, wherein $K=2^1, 2^2, \ldots, 2^k$ and k is a natural number.

4. An ATM switch according to claim 1, in which said OQM has KC input lines and C output lines, wherein $K=2^1, 2^2, \ldots, 2^k$, k is a natural number, $C=2^1, 2^2, \ldots, 2^c$, and c is a natural number.

5. An ATM switch according to claim 1, in which N/C OQMs are parallel-connected to said EBRN, wherein $N=2^1, 2^2, \ldots, 2^n$, $C=2^1, 2^2, \ldots, 2^c$, and n and c are natural numbers.

6. An ATM switch according to claim 1, in which said BSN rearrays and outputs inputted cells according to the corresponding output line group numbers.

7. An ATM switch according to claim 1, in which said EBRN lays out switching elements in the stages of $\log_2 N - \log_2 C$, wherein, $N=2^1, 2^2, \ldots, 2^n$, $C=2^1, 2^2, \ldots, 2^c$ and n and c are natural numbers.

* * * * *